United States Patent [19]

Wyhof

[11] 3,905,813

[45] Sept. 16, 1975

[54] LOW WEIGHT PHOTOCONDUCTIVE COMPOSITIONS

[75] Inventor: John R. Wyhof, Newark, Del.

[73] Assignee: ICI United States Inc., Wilmington, Del.

[22] Filed: May 21, 1973

[21] Appl. No.: 362,541

[52] U.S. Cl.................................. 96/1.5; 252/501
[51] Int. Cl.² ......................................... G03G 5/04
[58] Field of Search ............... 96/1.8, 1.5; 252/501; 260/850, 861

[56] References Cited
UNITED STATES PATENTS

| | | |
|---|---|---|
| 3,121,006 | 2/1964 | Middleton et al. ................. 96/1.8 |
| 3,709,684 | 1/1973 | Feltzin et al. ...................... 96/1.8 |
| 3,754,909 | 8/1973 | Feltzin et al. ...................... 96/1.8 |

Primary Examiner—Norman G. Torchin
Assistant Examiner—John L. Goodrow

[57] ABSTRACT

Low weight photoconductive recording materials for use in electrophotographic processes are disclosed. A low weight photoconductive composition for use in preparing the photoconductive recording materials is disclosed as well as the photoconductive sheet material. The particular photoconductive compositions contain polyester resins based upon an etherified diphenol and a dicarboxylic acid and a photoconductive pigment at a ratio within the range of about 0.5:1 to 1:1, respectively.

11 Claims, No Drawings

LOW WEIGHT PHOTOCONDUCTIVE COMPOSITIONS

This invention relates to photoconductive recording materials and to photoconductive compositions. More particularly, the present invention relates to photoconductive recording materials and photoconductive compositions for use in the ELECTROFAX, electrophotographic processes. More specifically, the present invention relates to photoconductive recording materials which are multi-layer laminates consisting of said photoconductive compositions and a conductive substrate.

Since the development of the direct (ELECTROFAX process), the direct process has been at a distinct disadvantage due to the requirement that the photoconductive paper must have the proper conductive properties to maintain a charge image and yet it must also compete with commercial bond paper in its physical and aesthetic properties. Therefore, it is preferred that the photoconductive paper should weigh approximately the same weight as good grade bond paper, that is, about 60 pounds per ream, and have the same crease and tear resistance as good bond paper. Heretofore with known photoconductive compositions, it has been necessary to coat the paper (conductive substrate) with a resin binder-photoconductive pigment composition at the rate of about 15 to 18 pounds of photoconductive composition per ream (3,000 square feet) of paper. Obviously, with such additional weight of the photoconductive pigment coating, the final weight of the photoconductive paper is increased greatly.

Therefore, it is an object of this invention to provide a low weight photoconductive composition which can be applied to a paper substrate.

It's another object of this invention to provide a low weight photoconductive material which has a high charge acceptance.

It is another object of the present invention to provide a photoconductive recording material which has a high light decay rate.

These and still other objects will come apparent to those skilled in the present art from the following detailed description of the invention.

In general this invention provides a photoconductive composition which is comprised of a photoconductive pigment and an electrically insulating polyester resin of a dicarboxylic acid and a polyol, said polyol comprising an etherified diphenol, wherein the ratio of pigment to polyester resin is in the range of from about 0.5:1 to 1:1.

Said etherified diphenol used in the insulating polyester resin of the photoconductive composition of this invention may be represented by the following formula:

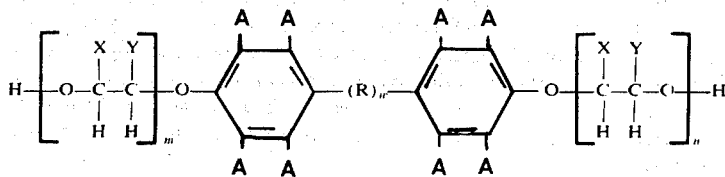

In this formula $w$ represents an integer of 0 or 1; R is an alkylene radical of one to five carbon atoms, oxygen, sulfur or a divalent radical represented by the formula:

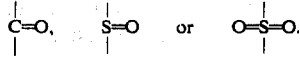

Each A is individually selected from either a halogen atom or a hydrogen atom; the letters $m$ and $n$ are integers from 0 through 6 with the proviso that the sum of $m$ and $n$ is at least about 2 and less than 7; and X and Y are radicals which are individually selected from the following group: alkyl radicals of one to three carbon atoms, a phenyl radical, or a hydrogen atom; provided that in any X and Y pair on adjacent carbon atoms either X or Y is a hydrogen atom. A preferred group of etherified diphenols within the above formula includes those where each A is either a chlorine atom or hydrogen and/or R is an alkylene radical containing one to three carbon atoms, and X and Y are either hydrogen or a methyl radical. In this preferred group the average sum of $n$ and $m$ is at most about 3. Examples of etherified diphenols within the above formula include the following: polyoxyethylene (3)-2,2-bis(4-hydroxyphenyl)propane; polyoxystyrene(6)-bis(2,6-dibromo-4-hydroxyphenyl)methane; polyoxybutylene(2.5)-bis(4-hydroxyphenyl) ketone; polyoxyethylene(3)-bis(4-hydroxyphenyl) ether; polyoxystyrene(2.8)-bis(2,6-dibromo-4-hydroxyphenyl) thioether; polyoxypropylene(3)bis (4-hydroxyphenyl) sulfone; polyoxystyrene(2)-bis(2,6-dichloro-4-hydroxyphenyl) ethane; polyoxyethylene(3)-bis(4-hydroxyphenyl) thioether; polyoxy-propylene(4)-4,4' bisphenol, polyoxyethylene (7)-bis(2,3,6-trifluorodichloro-4-hydroxyphenyl) ether; polyoxyethylene (3.5)-4,4-bis(4-hydroxyphenyl)pentane; polyoxystyrene(4)-2-fluoro-4-hydroxyphenyl-4-hydroxyphenyl sulfoxide; and polyoxybutylene (2)-3,2 -bis(2,3,6-tribromo-4-hydroxyphenyl)butane.

A class of readily available etherified diphenols within the above formula are the bisphenols. A preferred class of etherified bisphenols are those prepared from 2,2-bis(4-hydroxy-phenyl)propane or the corresponding 2,6,2',6'-tetrachloro or tetrafluoro bisphenol alkoxylated with from 2 to 4 mols of propylene or ethylene oxide per mol of bisphenol.

In addition to said etherified diphenol, aa dihydroxy alkane may be used in preparing the insulating polyester resins of the photoconductive composition of this invention. Thses dihydroxy alkanes contain from two to eight carbon atoms. A preferred group of dihydroxy alkanes include propylene glycol, ethylene glycol, and neopentyl glycol. Examples of other dihydroxy alkanes which can be used include 1,3-dihydroxybutane, 1,4-dihydroxypentane, 1,2-dihydroxyhexane, 2,3-dihydroxybutane, and 1,2-dihydroxyoctane. In general the dihydroxy alkane may be present at levels of up to 60 weight percent of the polyol used in preparing said insulating polyester.

Polyhydroxy alkanes which contain from three to six hydroxyl groups and from three to six carbon atoms may also be incorporated as an additional polyol in preparing the insulating polyester resins of this invention. Exemplary of these polyhydroxy alkanes are sorbitol, pentaerythritol, xylitol, 1,2,3-butanetriol, and 1,2,5,6-hexanetetrol. Polyoxyethylene and polyoxypropylene derivatives of the aforementioned polyhydroxyalkanes which contain up to about 5 mols of oxyethylene or oxypropylene per mol of hydroxyl of said polyhydroxy alkane and preferably 1 mol of oxyethylene or oxypropylene per mol can be used. Examples of these polyhydroxy alkane derivatives include polyoxyethylene (10) mannitol, polyoxyethylene(15) pentaerythritol, polyoxyethylene (16) sorbitol and polyoxypropylene(15) 1,2,3-butanetriol. These polyhydroxy alkanes and derivatives thereof are usually present as at most about 3 parts by weight per 100 parts of said etheriifed diphenol, and preferably less than two parts by weight. In a preferred group of polyol blends the weight ratio of etherified diphenols to dihydroxy alkanes is from 1.5 to 0.67. Polyol blends containing etherified diphenols, polyhydroxy alkanes and dihydroxy alkanes within the limits set out above are also within the polyol blends contemplated.

In general the dicarboxylic acid used in preparing the electrical insulating polyester resins of the photoconductive composition of this invention may be saturated or ethylenically unsaturated, and may contain substituents such as halogen. Among these dicarboxylic acids are the following: phthalic acid, fumaric acid, maleic acid, succinic acid, isophthalic acid, malonic acid, cyclohexane dicarboxylic acid, glutaric acid, adipic acid, and the anhydrides of these acids. A preferred group of acids and anhydrides include fumaric, maleic, and succinic acids.

The insulating polyesters of this invention may be prepared by the reaction of the dicarboxylic acid with the etherified diphenol. The reaction may be performed in an inert atmosphere employing moderate temperatures and substantially atmospheric pressures during the early stage, thus minimizing the loss of dicarboxylic acid by volatilization. As the reaction proceeds the temperature may be increased and the pressure reduced. Esterification catalyst may be used although it is generally preferred to carry out the reaction in the absence of excessive amounts of catalyst to avoid contamination of the final resinous product. Where an unsaturated dicarboxylic acid is used, it is usually desirable to include a small amount of polymerization inhibitor such as hydroquinone, pyrogallol, or the like. The reaction temperature required for preparing the final polyesters of this invention will usually include heating to about 200°C. for a portion of the reaction. The resultant polyesters usually have low acid numbers; that is acid numbers less than about 30. Usually the ratio of carboxyl groups and hydroxyl groups in the reaction mixture used for preparing the polyester resins of this invention is about 1. However, ratios as low as about 0.8 and as high as about 1.2 can readily be used.

A superior insulating polyester resin for use in preparing the photoconductive compositions of this invention may be prepared by reacting up to about 4 weight percent, based on weight of insulating polyester resin, of an organic epoxy compound having a molecular weight of from about 44 to 1,000 or an alkoxylated phenol or an alkoxylated alkyl phenol with the polyester resins disclosed above. The expression "organic epoxy compounds" is used to include only those compounds containing at least one

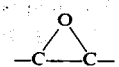

group, that is vicinal epoxy compounds. The epoxy compounds may be saturated or unsaturated, straight chain or branched chain, aliphatic, cycloaliphatic, aromatic, or heterocyclic. Mixtures of epoxy compounds may also be used to prepare these compositions. Among the numerous epoxy compounds and alkoxylated phenolic compounds which may be used in accordance with this invention are vinyl cyclohexanedioxide, diglycidyl ether of 2,2-di(4-hydroxyphenyl) propane; phenylglycidyl ether; 1,2-epoxyeicosane; cyclooctane epoxide; 1,2-epoxyoctane; epichlorohydrin; ethylene oxide; butylene oxide; styrene oxide; cyclohexane oxide; 3,4-hexylethylene oxide; hydroxyethyl, 2-methylphenyl ether; polyoxypropylene (3)phenol; polyoxybutylene(4.5)-6-propylphenol; polyoxyethylene(4)-4-pentylphenol; and 3,4-epoxycyclohexylethyl trimethoxysilane.

The reaction of the epoxy compounds or phenolic compounds with the polyester takes place at a temperature of from about 125°C. to about 200°C., and a reaction time of about a half hour to 10 hours has been found satisfactory. The polyester composition is modified with said epoxy or phenolic compound after the polyesterification is completed or prior to complete esterification so long as 70 percent of the esterification reaction is complete. The addition of the epoxy compound prior to 70 percent of the polyesterification being completed results in inferior resins.

The weight ratios of the organic epoxy compounds or phenolic compounds to the polyester compositions will vary widely, however, a weight ratio of from about 0.01 to 0.05 is preferred.

The photoconductive pigment used in preparing the photoconductive composition of this invention may be any pigment which can maintain a charge in unilluminated surroundings when insulated from its environment and yet dissipate this charge rapidly in the presence of a light source. Photoconductive pigments such as zinc oxide, zinc sulfide, antimony dioxide, selenium oxide, and those enumerated in U.S. Pat. No. R. 25,444 may be used in this invention.

Compositions of the invention may be prepared by the simple mixing of the solid polyester resin and the solid photoconductive pigment, in the presence or absence of a carrier solvent, in a blending mill, a ball mill, or similar mechanical means of mixing and grinding. A preferred method of preparing these blends is to dissolve the resin in a carrier solvent which is an inert organic solvent such as benzene or toluene, and add the photoconductive pigment to the solution. The mixture of resin solution and photoconductive pigment are then ground to a fineness of from 5 to 6½ on the NS Hegman scale. Where a carrier solvent is used, the combination of photoconductive composition and the carrier solvent is known in the art as a binder solution. In reality this is a dispersion since the photoconductive pigments are not dissolved.

Sensitizers may be included in said photoconductive compositions as optional ingredients. These sensitizers include bromophenol blue, disodium fluorescein, alizarin cyanine green GWA, and auramin O and other art recognized materials such as those listed in U.S. Pat. No. 3,245,786 starting at line 54, column 15. These sensitizers are usually added as 1 percent solutions in methanol. The concentration of these sensitizers will usually be from about 0.0005 to about 5.0 weight percent calculated upon the photoconductive pigment content of the photoconductive composition. A preferred amount of sensitizers is usually about 0.01 to 0.1 weight percent. The sensitizers may be used solely or as mixtures and a preferred composition contains bromophenol blue, alizarin cyanine green GWA, disodium fluorescein, and auramin O in a weight ratio of 1:1:1.4:0.1 respectively.

Using the binder solutions of this invention, photoconductive recording material, which may be used in the direct electrophotographic process, can be prepared. Said photoconductive recording materials comprised of a conductive substrate and a photoconductive composition within those disclosed above and is in the form of paper-like sheets. In general, in accordance with the present invention the conductive substrate (paper or other suitable substrate) is coated with about 2 to 11 pounds of a photoconductive composition disclosed above per 3000 square feet of substrate in order to obtain photoconductive recording material of the present invention. In a preferred embodiment, the conductive substrate is coated with from about 5 to 10 pounds of a photoconductive composition described above per 3000 square feet of substrate.

Among the conductive substrates which may be used to prepare the photoconductive recording materials of this invention are sheets of: filled polyethylene or polypropylene; metal foils such as silver, gold, and aluminum; metal foil on a non-conductive or conductive paper base; other filled polymers such as filled polyvinyl chloride, and various papers which may be coated or uncoated depending upon the conductive properties of the paper. These papers include baryta-coated paper and glassine paper. The filled polyethylene or polypropylene contain from 15 to 30 parts of the polymer, from about 20 to 70 parts of calcium carbonate, aluminum silicate, silicone, dioxide, kaolin or vermiculite, and from 10 to 50 parts of a plasticizer such as a plasticizer petroleum oil.

The preferred conductive substrate is a conductive paper. This preference arises from the similarity between these sheets and typical copies prepared by other means of printing. The conductive paper used as a substrate may be made by many means such as impregnating paper with a conductive material or coating paper with a barrier coating which is conductive. The latter technique has the additional advantage that the barrier coating can also effectively stop penetration of the substrate by the photoconductive layer.

Impregnating materials for conductive paper include sodium chloride, magnesium chloride, ammonium chloride, and these materials in humectant solutions such as in glycerine or sorbitol. Additional impegnating materials include acids such as benzene sulfonic acid and trichloro acetic acid. It has been found that a conductive polymer layer which is also a barrier coating reduces the effect of humidity on the reproduction quality of the final photoconductive paper. Among the conductive polymers are included such resins as alkyd resins and polymers containing quaternized ammonium moieties. Alkyd resins used in preparing photoconductive paper can also contain conductive fillers. An example of a typical alkyd resin is that made from crotonic acid, glycerol, dicyanodiamide, and zinc oxide plus tetrachlorophalic anhydride and sodium thiosulfate. Examples of typical conductive polymers are poly(vinylbenzenetrimethylammoniumchloride), poly[methylene(1,3,5-piperidinediyl-methochloride)], and quaternized polyethylene imine.

The coatings of the conductive polymers are applied to the substrate by conventional coating techniques to form an even layer of the conductive polymer. This even layer enables the even spreading of the photoconductive layer.

The photoconductive paper prepared in accordance with this invention includes the conductive paper and the photoconductive composition disclosed above. Photoconductive paper may be prepared by the following procedure: a conductive resin is transferred to paper by a standard coating technique such as wire wound rods. The paper is force dried and after drying the photoconductive material is coated over the conductive paper and dried.

In order for those skilled in the art to fully understand the above disclosure and particularly illustrate the invention embodied herein, the following non-limiting examples are given. These examples include the preparation of the insulating polyester resins for use in the photoconductive compositions, preparation of photoconductive compositions, and the preparation of photoconductive recording material including photoconductive paper.

EXAMPLE 1

1,574 grams of polyoxypropylene(2.2)-2,2-bis(4-hydroxyphenyl) propane and 374 grams of polyoxypropylene(16)-2,2-bis (4-hydroxyphenyl)propane are charged into a three-liter reaction flask equipped with a stirrer, condenser, carbon dioxide inlet tube, thermometer and heating mantle. The resulting reaction mixture is heated to between 60°C. and 80°C. until the polyols are liquid. At this point, 553 grams of fumaric acid and 1.25 grams of Tecquinol (hydroquinone) are added to the reaction mixture. Carbon dioxide gas is introduced continuously during the course of the reaction but is shut off during this addition. When the addition is completed, the temperature of the reaction mixture is increased to 210°C. and the reaction continued until the acid number is between 15 and 20. At this point the reaction mixture is allowed to cool to room temperature and the resin reaction product is obtained.

EXAMPLE 2

1,865 grams of polyoxypropylene(2.2)-2,2-bis(4-hydroxyphenyl)propane and 2.9 grams of polyoxypropylene(6) sorbitol are charged to a 3-liter, four-necked, round-bottom reaction flask which is fitted with a thermometer, a stainless steel stirrer, a glass inlet tube, and a downward condenser. The flask is supported in a GLAS-COL electric heating mantle. Through the glass inlet tube nitrogen gas is allowed to flow sparging the polyol blend and resulting in an inert atmosphere in the reaction vessel. The agitator and heating mantle are then activated and the polyol blend is heated to 50°C. at which time 628 grams of fumaric acid and 1.25 grams of hydroquinone are added to the reaction vessel. The nitrogen gas flow is then regulated at a setting of 2.5 on a SHO-RATE meter of the Brooks Rotometer Company. The reaction mass is heated to a temperature of 210°C. over a period of 5 hours. Water of esterification is removed as it is formed and the mass is maintained at 210°C. for an additional 6½ hours. The course of the reaction is followed by acid value determinations at hourly intervals. At the end of the reaction, when an acid value of about 20 is achieved, the resin is cooled to room temperature. The resin has an acid value of 18.6, a ball and ring softening point of 104°C., a tack point of 75°C., and a liquid point of 100°C. The ratio of hydroxyl groups and carboxyl groups in the preparation of this resin is 1:1.

EXAMPLE 3

In accordance with the procedure of Example 2, 985 grams of polyoxyethylene(3) bis(4-hydroxyphenyl)ketone and 44.3 grams of polyoxyethylene(30) pentaerythritol are placed in a 3-liter, round-bottom flask. This mixture is heated and when the reaction temperature reaches 50°C., 348 grams of succinic acid are added. The reaction mixture is then heated to a temperature of 215°C. and the water of reaction is continually removed. The course of the reaction is followed by taking hourly samples in determining the acid value. After an acid value of 30 is reached, the heat is removed and the reaction mixture is slowly cooled to room temperature. The resulting polyester is a hard, tough solid.

EXAMPLE 4

According to the procedure of Example 2, 2,190 grams of polyoxyethylene(2.5)-2,2-bis(4-hydroxy-2,6-chlorophenyl)propane and 21 grams of polyoxyethylene(12) xylitol are placed in a four-liter flask. This mixture is heated and when a temperature of 50°C. is obtained, 465 grams of maleic acid are added. The heating is continued until a temperature of 210°C. is achieved at which point the temperature is maintained at 210°C. The water of esterification is removed as it is formed through a condenser. The acid value of the reaction mixture is tested at hourly intervals and when the acid number is less than 30, the reaction mixture is cooled to room temperature. The resultant polyester is a tough solid resin.

EXAMPLE 5

1,882 grams of polyoxypropylene(2)-2,2-bis(4-hydroxyphenyl)propane is charged to a reaction kettle, fitted with an air inlet tube, a condenser, an agitator, and a thermometer. This reaction component is then heated with stirring and inert gas purging. When the temperature reaches 80°C., 618 grams of fumaric acid and 1.25 grams of hydroquinone are added to the reaction vessel. The heating is continued until 210°C. is reached and then the temperature is maintained at this level. Periodic samples of the reaction mixture are taken and acid value is determined. When the acid value is less than 25 but more than 15, the reaction mixture is removed from the heat source and allowed to cool to room temperature on a tray cooler. The final acid value for this resin is 16.4 and the resin exhibits a ball and ring softening point of 103°C.

EXAMPLE 6

According to the procedure of Example 5, 631 grams of polyoxystyrene(6)-2,2-bis(4-hydroxyphenyl)propane, 114 grams of fumaric acid, and 0.4 gram of hydroquinone are reacted at a temperature of 210°C. until an acid value of less than about 25 is determined. The final acid value of this resin after cooling is 18.55.

EXAMPLE 7

According to the procedure of Example 5, 457 grams of polyoxybutylene(2)-2,2-bis(4-hydroxyphenyl)propane and 142 grams of succinic acid are reacted at a temperature of 210°C. The reaction is continued until an acid value of less than about 20 is reached. The resin is then cooled in an open pan and is found to have a ball and ring softening point of 68°C. and a final acid value of 14.1.

EXAMPLE 8

2,140 grams of polyoxypropylene(2)-2,2-bis(4-hydroxyphenyl)propane, 423 grams of ethylene glycol, 1,440 grams of fumaric acid, and 2 grams of hydroquinone are added to a 5-liter, four-necked reaction flask, equipped with a stirrer, a gas inlet tube, a water cooled condenser, and a thermometer. The temperature of this mixture is slowly raised to 200°C. and is then maintained at this temperature with a distillation head temperature being between 100° and 103°C. avoiding the loss of the ethylene glycol. The reaction is continued until an acid value of less than about 25 is reached. The resin is then removed and cooled on an open pan and found to have a ball and ring softening point of 94°C. and an acid value of 18.6.

EXAMPLE 9

2,025 grams of polyoxypropylene(2)-2,2-bis(4-hydroxyphenyl)propane are added to a 4-liter, four-necked reaction vessel. This reactant is heated to 80°C. at which time 612 grams of the neopentyl glycol, 1,363 grams of fumaric acid, and 2 grams of hydroquinone are added to the reaction mixture. The reaction mixture is then heated to 210°C. and maintained at this temperature until an acid value of less than about 25 is reached. The resin is then cooled on an open pan and is found to have a ball and ring softening point of 95°C. and an acid value of 24.5.

EXAMPLE 10

5,400 grams of polyoxystyrene(2)-2,2-bis(4-hydroxyphenyl)propane are charged to a 4-liter, four-necked reaction vessel. The reaction mass is heated with stirring and under an inert nitrogen atmosphere to 80°C. When the reaction mass is fluid, 2,100 grams of an isophthalic acid is added and the reaction mixture heated to 210°C. After 2 hours the temperature is raised to 235°C. and held for 3 hours at this temperature at which point the temperature is raised to 250°C. and held at this temperature until the ball and ring softening point of a sample is 113°C.

EXAMPLE 11

522 grams of polyoxybutylene(2)-2,2-bis(4-hydroxyphenyl)propane are charged to a 4-liter, four-necked reaction vessel and heated to 80°C. At this point 227 grams of isophthalic acid are added and the reaction temperature raised to 250°C. The reaction is stopped after 8 hours at temperature. The final acid value of this resin is 27.2 and the ball and ring softening point is 94°C.

EXAMPLE 12

According to the procedure of Example 5, 488 grams of polyoxypropylene(2.2)-2,2-bis(4-hydroxyphenyl)-propane, 160 grams of fumaric acid, and 0.33 grams of hydroquinone are reacted at a temperature of 210°C.

until the acid value of the reaction mixture reaches 19.4. At this point in the reaction, 6.5 grams of 3,4-epoxy cyclohexylethyltrimethoxysilane are added. The reaction is allowed to proceed at 210°C. for an additional hour. The final resin has an acid value of 14.7 and a ball and ring softening point of 104°C.

EXAMPLE 13

According to the procedure of Example 5, 488 grams of polyoxyethylene(2.2)-2,2-bis(4-hydroxyphenyl)propane, 160 grams of fumaric acid, and 0.33 grams of hydroquinone are reacted at 210°C. until an acid value of 30.5 is reached. At this point, 13 grams of phenyl glycidyl ether are added and the reaction continued at 210°C. until an acid value of less than 20 is determined. The resin is then cooled on a cooling pan and is found to have a ball and ring softening point of 93°C. and an acid value of 14.15.

EXAMPLE 14

According to the procedure of Example 5, 2,175 grams of polyoxypropylene(2)-2,2-bis(2,6-dibromo-4-hydroxyphenyl)propane, 321 grams of maleic anhydride, and 1.25 grams of hydroquinone are reacted at 210°C. The resin has a final acid value of 17.5 and a ball and ring softening point of 133°C.

EXAMPLE 15

According to the procedure of Example 5, 524 grams of polyoxypropylene(2)-2,2-bis(4-hydroxyphenyl)propane, 176 grams of fumaric acid, and 0.35 gram of hydroquinone are reacted at 210°C. until an acid value of 56.5 is determined. Seventy grams of the diglycidyl ether of 2,2-bis(4-hydroxyphenyl)propane are then added to the reaction mixture and held for an additional 2 hours at 210°C. The resulting resin has a final acid value of 19.74.

EXAMPLE 16

According to the procedure of Example 5, 1,882 grams of polyoxypropylene(2.2)-2,2-bis(4-hydroxyphenyl)propane, 618 grams of fumaric acid, and 1.25 grams of hydroquinone are reacted at 210°C. until the acid value is less than 30 but more than 25. At this point, 75 grams of polyoxyethylene(1.1) cresol are added. The reaction is continued until an acid value of less than 20 is determined. The resin after cooling has an acid value of 10.8 and a ball and ring softening point of 103°C.

EXAMPLE 17

249 pounds of polyoxypropylene(2.2)-2,2-bis(4-hydroxyphenyl)propane, 72.2 pounds of polyoxypropylene(9)-2,2-bis(4-hydroxyphenyl)propane, and 78.8 pounds of maleic anhydride are added to a reaction kettle under nitrogen flow. The resulting reaction mixture is heated to about 185°C. and held at that temperature for 1½ hours. The temperature is then elevated to 220°C. until the acid number of the reaction mixture is approximately 30 at which point a full vacuum is drawn and the reaction is continued until the acid number is about 16 to 15. At this point, 1,825 grams of neopentyl glycol and 45.4 grams of Tecquinol are added to the reaction mixture. The resulting mixture is agitated for an additional 1-hour period while maintaining the temperature at about 220°C. (total time at 220°C. about 3 hours and 25 minutes). Then the reaction mixture was allowed to cool to room temperature to yield the desired resin product.

Examples of dispersions of the photoconductive compositions of this invention are given in Examples 18 to 22 where parts are by weight in grams. The procedure for preparing these photoconductive composition dispersions is as follows:

The polyester resin is dissolved in about one-third of the solvent, i.e., toluene or other organic solvent, and is mixed with a slurry of photoconductive pigment in the remaining two thirds of the solvent. This mixture is then charged to an 8580 Eberbach stainless steel container fitted for Waring Blender and ground on this blender to a fineness of 5 to 6½ of the NS Hegman scale. Sensitizers are then added as a solution at a concentration of from ½ to 10 percent by weight.

The sensitizers used in the photoconductive composition of Examples 18 to 22 could have been either a single sensitizer or a combination of sensitizers and are used as a 1 to 2 percent solution in methanol or other equivalent solvents. Sensitizer A is a 1% solution in methanol of a combination of 27 parts bromophenol blue, 42 parts sodium fluorescein, 28 parts alizarine cyanine green, and 3 parts auramine O.

| EXAMPLE 18 | |
|---|---|
| Polyoxypropylene(2.2)-2,2-bis(4-hydroxyphenol)propane | - 33.3 grams |
| Zinc Oxide | - 16.7 grams |
| Sensitizer A | - 0.33 grams |
| Toluene (dry) | - 50.0 grams |
| EXAMPLE 19 | |
| Polyoxypropylene(2.2)-2,2-bis(4-hydroxyphenol)propane | - 25.0 grams |
| Zinc Oxide | - 25.0 grams |
| Sensitizer A | - 0.5 grams |
| Toluene (dry) | - 50.0 grams |
| EXAMPLE 20 | |
| Resin of Example 1 | - 28.6 grams |
| Zinc Oxide | - 21.4 grams |
| Sensitizer A | - 2.14 grams |
| Toluene (dry) | - 75.0 grams |
| EXAMPLE 21 | |
| Resin of Example 17 | - 33.35 grams |
| Zinc Oxide | - 16.7 grams |
| Toluene (dry) | - 70.05 grams |
| Sensitizer A | - 1.67 grams |
| EXAMPLE 22 | |
| Resin of Example 17 | - 25.0 grams |
| Zinc Oxide | - 25.0 grams |
| Toluene (dry) | - 60.0 grams |
| Sensitizer A | - 2.5 grams |

The photoconductive compositions illustrated in Examples 18 to 22 are all photoconductive quality and thus the zinc oxide is not normal pigment quality but is that produced by the usual French process for preparing photoconductive zinc oxide (Comprehensive treatise on Inorganic Chemistry by Mellor, Volume IV, 1927).

The photoconductive composition dispersion illustrated in Examples 18 to 22 when applied to conductive paper yield photoconductive paper. In order to illustrate the quality of the photoconductive recording material prepared from the photoconductive compositions of this invention photoconductive recording material is prepared by the following procedure. A photoconductive composition according to Examples 18 to 22 is applied to a paper made conductive by a coating of a polyquaternary ammonium type polymers as a conductive layer. Such a conductive paper is sold by FLETCHER Paper Company and designated "conductive base paper." The photoconductive compositions are poured onto a sheet of the conductive paper and then spread across the paper by hand using a steel wire wound rod for evenly spreading the photoconductive compositions across the paper. After coating, the sheets are dried for a period of from 1 to 2 minutes at 70°C. and the dry coated sheets are adapted, by maintaining them for at least 24 hours at 50 percent relative humidity and 25°C., before testing. The photoelectric properties of these sheets are tested on a Most Stati-Tester available from M. K. Associates, Boston Massachusetts. Using the negative corona charging mode, the paper samples were charged 5 seconds at 50 microamps. The charge acceptance in volts (CA) was then determined. The dark decay rate in volts per second (DDR) was determined for the 5-second period after the corona was shut off. The light decay rate in volts per second (LDR) was the average voltage decay to one-half the initial voltage while the paper was exposed to the calibrated light source in the Stati-Tester.

By dividing the CA/sample by the pounds coating/sample, the volts per pound of coating can be calculated. The data on coatings prepared by the above method and tested by the above methods are illustrated in Table I for the photoconductive compositions of this invention.

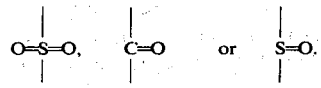

A is either a halogen atom or a hydrogen atom, $m$ and $n$ are integers from 0 through 6 with the proviso that the sum of $n$ and $m$ is at least about 2 and less than 7, and X and Y are radicals individually selected from the group consisting of alkyl radicals of one to three carbon atoms, phenyl radicals, and hydrogen atoms with the proviso that in any X and Y pair on adjacent carbon atoms, either X or Y is hydrogen; and a dicarboxylic acid, wherein the ratio of carboxyl groups to hydroxyl groups is about unity.

2. A composition of claim 1 wherein the pigment is selected from the group consisting of zinc oxide, zinc sulfide, antimony dioxide, and selenium oxide.

3. A composition of claim 1 wherein the etherified diphenol is an etherified bisphenol and said bisphenol is selected from the group consisting of 2,2-bis(4-hydroxyphenyl) propane; 2,2-bis(2,6-dichloro-4-hydroxyphenyl)propane; and 2,2-bis(2,6-dibromo-4-hydroxyphenyl)propane, and said etherified bisphenol contains from two to four mols of oxyethylene or oxypropylene groups per mol of etherified bisphenol.

4. A composition of claim 1 wherein the etherified diphenol is polyoxypropylene(2.2)-2,2-bis(4-hydroxyphenyl) propane.

TABLE I

PHOTOCONDUCTIVE PAPER PROPERTIES

| Example Number | Photoconductive Composition of Example | Pounds of Photoconductive Composition Per 3000 Square Feet of Paper | CA (in volts) | Charge Acceptance (volts/pound) | DDR (volts/second) | LDR (volts/second) |
|---|---|---|---|---|---|---|
| 23 | 18 | 2.5 | 170 | 68.1 | 4.4 | 96* |
| 24 | 18 | 5.1 | 340 | 66.5 | 4.0 | 137* |
| 25 | 18 | 6.0 | 360 | 60.1 | 4.4 | 137* |
| 26 | 18 | 8.7 | 453 | 52.1 | 2.6 | 158* |
| 27 | 19 | 3.2 | 177 | 55.4 | 0.4 | 184* |
| 28 | 19 | 6.6 | 300 | 45.5 | 2.8 | 226* |
| 29 | 19 | 7.3 | 300 | 41.1 | 2.4 | 236* |
| 30 | 19 | 9.2 | 376 | 40.8 | 3.2 | 255* |
| 31 | 20 | 4.2 | 168 | 40.0 | 5.0 | 226** |
| 32 | 20 | 6.8 | 279 | 41.0 | 7.7 | 380** |
| 33 | 20 | 8.8 | 362 | 41.1 | 8.8 | 492** |
| 34 | 21 | 6.2 | 240 | 38.6 | 4.0 | 189** |
| 35 | 21 | 7.2 | 272 | 37.8 | 4.4 | 221** |
| 36 | 21 | 8.5 | 342 | 40.2 | 4.8 | 289** |
| 37 | 22 | 6.8 | 197 | 29.0 | 3.4 | 370** |
| 38 | 22 | 7.5 | 220 | 29.3 | 2.8 | 472** |
| 39 | 22 | 9.5 | 275 | 29.0 | 4.0 | 629** |

*Tested at 100 foot-candle.
**Tested at 20 foot-candle.

Having thus described the invention, the following is claimed:

1. A photoconductive composition comprising a photoconductive pigment and an electrically insulating polyester resin in a weight ratio of from about 0.5:1 to 1:1 respectively, wherein said polyester resin is a resin of a polyol comprising an etherified diphenol represented by the formula

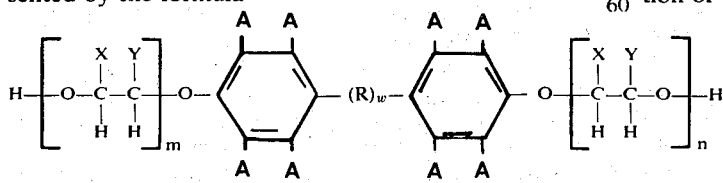

wherein $w$ is 0 or 1, R is an alkylene radical of one to five carbon atoms, oxygen, sulfur or a divalent radical represented by the formula 5. A composition of claim 4 wherein the pigment is zinc oxide.

6. A composition of claim 5 wherein the ratio of pigment to polyester resin is about 1 to 1.

7. A composition of claim 5 wherein the ratio of pigment to polyester resin is about 0.75 to 1.

8. A photoconductive recording material which comprises a conductive substrate coated with the composition of claim 1.

9. A photoconductive recording material which is comprised of a substrate consisting essentially of paper coated with the composition of claim 3.

10. A photoconductive recording material which is comprised of photoconductive paper coated with the composition of claim 4.

11. A photoconductive recording material which is comprised of a photoconductive paper coated with the composition of claim 5.

* * * * *